(12) United States Patent
Lee

(10) Patent No.: US 12,619,050 B2
(45) Date of Patent: May 5, 2026

(54) CAMERA MODULE

(71) Applicant: SAMSUNG ELECTRO-MECHANICS CO., LTD., Suwon-si (KR)

(72) Inventor: Ik Sun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 465 days.

(21) Appl. No.: 18/108,093

(22) Filed: Feb. 10, 2023

(65) Prior Publication Data

US 2023/0314759 A1 Oct. 5, 2023

(30) Foreign Application Priority Data

Apr. 5, 2022 (KR) ........................ 10-2022-0042282

(51) Int. Cl.
| | |
|---|---|
| *G02B 7/10* | (2021.01) |
| *G02B 13/00* | (2006.01) |
| *G02B 27/64* | (2006.01) |

(52) U.S. Cl.
CPC ......... *G02B 7/102* (2013.01); *G02B 13/0065* (2013.01); *G02B 27/646* (2013.01)

(58) Field of Classification Search
CPC .. G02B 7/102; G02B 13/0065; G02B 27/646; G02B 7/09; G02B 7/08; G02B 7/021; G02B 7/1821; G03B 13/36; G03B 5/00; G03B 30/00; G03B 17/12; G03B 3/00; G03B 5/02; G03B 2205/0046; G03B 2205/0007; G03B 2205/0069; G03B 17/17; G03B 2205/0015; G03B 3/10; G03B 5/04; H02K 33/18; H02K 41/0354; H04N 23/57; H04N 23/687; H04N 23/54
See application file for complete search history.

(56) References Cited

U.S. PATENT DOCUMENTS

| | | | | |
|---|---|---|---|---|
| 2018/0367714 | A1* | 12/2018 | Im | H04N 23/687 |
| 2019/0004328 | A1* | 1/2019 | Lee | G02B 13/0065 |
| 2020/0137274 | A1* | 4/2020 | Lee | G03B 17/17 |
| 2020/0319439 | A1* | 10/2020 | Byon | G02B 26/0816 |
| 2021/0294184 | A1 | 9/2021 | Kim et al. | |

FOREIGN PATENT DOCUMENTS

| | | |
|---|---|---|
| KR | 10-2013-0002817 A | 1/2013 |
| KR | 10-1740814 B1 | 5/2017 |
| KR | 10-2021-0117124 A | 9/2021 |

\* cited by examiner

*Primary Examiner* — Shan Liu
(74) *Attorney, Agent, or Firm* — NSIP Law

(57) ABSTRACT

A camera module is provided. The camera module includes a housing configured to have an internal space; a lens module disposed in the internal space, an including at least one lens; a first magnetic body and a second magnetic body disposed on surfaces on which the housing and the lens module face each other, respectively, and configured to have magnetic forces which act on each other; and a plurality of ball members disposed between the housing and the lens module. The lens module includes a plurality of extensions which extend in an optical axis direction and are spaced apart from each other in a direction, perpendicular to an optical axis, and at least one of the plurality of ball members is disposed between the plurality of extensions and the housing.

17 Claims, 8 Drawing Sheets

300

301

320

330

310

700

Z

X

Y

CAMERA MODULE

CROSS-REFERENCE TO RELATED APPLICATIONS

This application claims the benefit under 35 USC § 119(a) of Korean Patent Application No. 10-2022-0042282, filed on Apr. 5, 2022, in the Korean Intellectual Property Office, the entire disclosure of which is incorporated herein by reference for all purposes.

BACKGROUND

1. Field

The following description relates to a camera module.

2. Description of Related Art

Camera modules that capture still or moving images have been widely implemented in portable electronic devices, including, but not limited to, smartphones. It is desirable that portable electronic devices have a slim form factor in accordance with market demand, and accordingly, it is desirous that a size of the camera module be miniaturized.

On the other hand, apart from the desire to miniaturize the camera module, performance improvements of the camera module are also desirous. For example, a camera module included in a portable electronic device has widely adopted functions or operations such as autofocusing (AF) and optical image stabilization (OIS), and there is a limit to reducing the overall size of the camera module to perform these functions or operations.

To solve this problem, a camera module having a reflective member that changes the path of incident light has been proposed. Such a camera module may have a longer total track length (TTL) by changing the path of the incident light one or more times, and may perform more advanced autofocusing or zooming functions or operations. However, such a camera module may have a flare phenomenon due to unnecessary light reflection due to a relatively long total track length, and the quality of the image may be deteriorated due to the flare phenomenon.

Additionally, when implementing the autofocusing or zoom function or operation, the lens travel distance is relatively long, and thus, there may be a problem in that securing stable performance may be difficult.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a camera module includes a housing configured to have an internal space; a lens module, disposed in the internal space, and comprising at least one lens; a first magnetic body and a second magnetic body disposed on surfaces on which the housing and the lens module face each other, respectively, and configured to have magnetic forces which act on each other; and a plurality of ball members disposed between the housing and the lens module, wherein the lens module comprises a plurality of extensions which extend in an optical axis direction, and are spaced apart from each other in a direction, perpendicular to an optical axis, and at least one of the plurality of ball members is disposed between the plurality of extensions and the housing.

The lens module may include a lens carrier configured to move in the optical axis direction; and a lens barrel, disposed inside the lens carrier, and configured to accommodate the at least one lens, wherein the plurality of extensions are disposed on the lens carrier.

The camera module may include a reinforcing member disposed between a first side and a second side of the lens carrier.

The plurality of extensions may include a first protrusion that protrudes from a first side of the lens carrier in the optical axis direction; and a second protrusion that protrudes from a second side of the lens carrier in the optical axis direction, wherein the first protrusion and the second protrusion are spaced apart from each other in a direction, perpendicular to the optical axis.

The first protrusion and the second protrusion are symmetrical in a direction, perpendicular to the optical axis.

The lens module may include a support member that is configured to connect the first protrusion and the second protrusion, wherein a first surface of the support member may be in contact with the lens barrel in the optical axis direction, and a second surface of the support member has a hole shape in the optical axis direction.

The camera module may include a light blocking member disposed between the first side of the lens carrier and the second side of the lens carrier, in contact with the support member, and configured to have a hole shape through which light passes in the optical axis direction.

End edges of the first protrusion and the second protrusion may be configured to have one of a curved surface and an inclined surface in a direction away from the optical axis.

Any one of the plurality of ball members may be configured to be in contact with one of the lens module and the housing, and wherein remaining ball members among the plurality of ball members may be configured to be in contact with the lens module and the housing.

A virtual line that connects centers of the remaining ball members may have a triangular shape.

A center of magnetic attraction acting between the first magnetic body and the second magnetic body may be located inside the triangular shape connecting the centers of the remaining ball members.

The plurality of ball members may include a first ball member disposed between the first protrusion and the housing, a second ball member disposed between the first side of the lens carrier and the housing, a third ball member disposed between the second protrusion and the housing; and a fourth ball member disposed between the second side of the lens carrier and the housing.

The second ball member, the third ball member, and the fourth ball member are configured to contact the lens module and the housing, and wherein the first ball member is in contact with one of the lens module and the housing.

The first ball member may have a diameter that is less than diameters of the second ball member, the third ball member, and the fourth ball member.

A first guide groove that accommodates the first ball member may be respectively disposed on surfaces of the first protrusion and the housing that face each other, a second guide groove that accommodates the second ball member may be disposed on surfaces on which the first side of the lens carrier and the housing face each other, respectively, a third guide groove that accommodates the third ball member is respectively disposed on surfaces of the second protrusion and the housing which face each other, a fourth guide groove that accommodates the fourth ball member may be respectively disposed on surfaces on which the second side of the lens carrier and the housing face each other, and a depth of the first guide groove of at least one of the first protrusion and the housing may be different from a depth of the second guide groove, the third guide groove, and the fourth guide groove.

The first ball member and the second ball member may be spaced apart from each other in the optical axis direction, and the third ball member and the fourth ball member may be spaced apart from each other in the optical axis direction.

The first ball member may be in two-point contact with one of the lens module and the housing, and the second ball member may be in two-point contact with one of the lens module and the housing and may be in one-point contact with another of the lens module and the housing, and the third ball member and the fourth ball member may be in contact with the lens module and the housing at two points, respectively.

The lens carrier is configured to have an H-shape structure based on relative positions of the plurality of extensions and a supporting member configured to connect the plurality of extensions.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
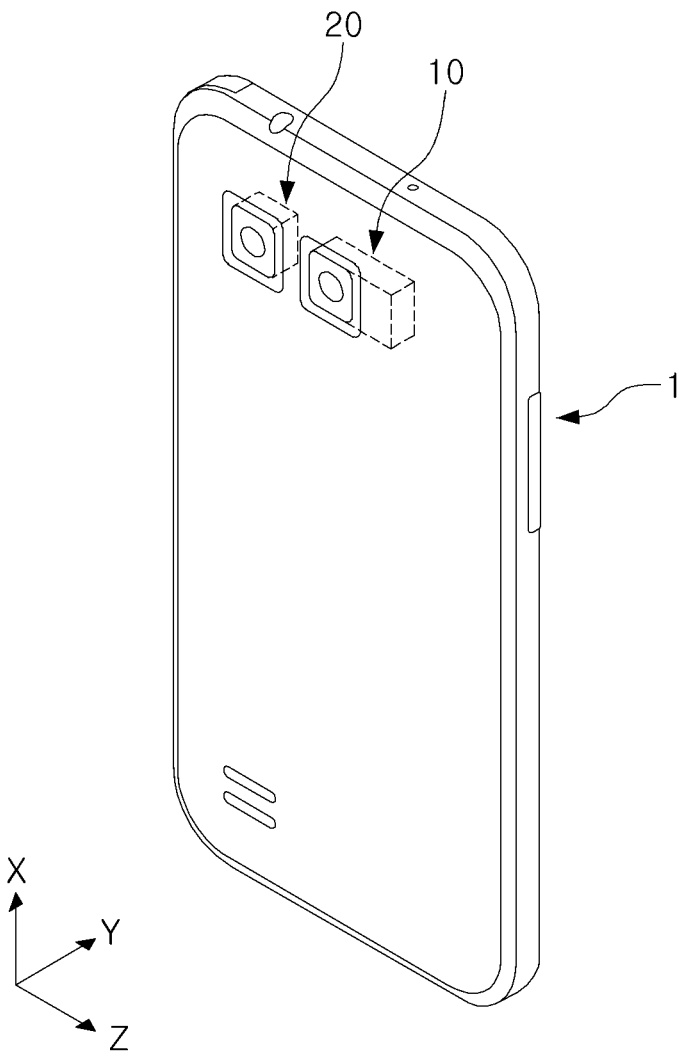
FIG. 1 is a perspective view of an example electronic device with a camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

In addition, in the present specification, expressions such as upper side, upper side, lower side, lower side, side surface, front side, back side, etc. are expressed based on the direction shown in the drawings, and if the direction of the corresponding object is changed, it can be expressed differently.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

One or more examples may provide a stable support structure of a lens module.

FIG. 1 is a perspective view of an example electronic device 1 including a camera module, in accordance with one or more embodiments.

The example electronic device 1 may include one or more camera modules. For example, the electronic device 1 may be a portable electronic device 1 such as a mobile communication terminal including the camera modules 10 and 20, a smart phone, or a tablet personal computer (PC), as only examples.

In an example, one or more camera modules 10 and 20 may be disposed on one surface of the electronic device 1, and may be implemented to image a subject. For example, as illustrated in FIG. 1, a plurality of camera modules 10 and 20 may be arranged side by side on the rear portion of the electronic device 1.

The plurality of camera modules 10 and 20 provided in the electronic device 1 may include a first camera module 10 and a second camera module 20 having different angles of view. The first camera module 10 may be configured to have a relatively narrow angle of view (e.g., a telephoto camera), and the second camera module 20 may be configured to have a relatively wide angle of view (e.g., a wide-angle camera). In non-limiting examples, the angle of view of the first camera module 10 may be formed in the range of 9° to 35°, and the angle of view of the second camera module 20 may be formed in the range of 60° to 120°. However, the ranges of the angles of view described above are only example ranges, and the angle of view of the camera modules 10 and 20 may be variously configured. Accordingly, by implementing the angles of view of the two camera modules 10 and 20 differently from each other, it is possible to capture images of the subject at various depths, and various image implementations may be possible, such as combining or implementing images to overlap each other.

Each of the plurality of camera modules 10 and 20 may have a simple structure and can acquire clear image information while implementing functions such as, but not limited to, autofocus adjustment (AF), zoom, and optical image stabilization (01S).

At least one camera module among the plurality of camera modules 10 and 20 may be a camera module 10 described below with reference to FIGS. 2 to 8. For example, in the example of the electronic device 1 having two camera modules 10 and 20, at least one of the two camera modules 10 and 20 may correspond to the camera module 10 according to embodiments described with reference to FIGS. 2 to 8.

Figure 2:
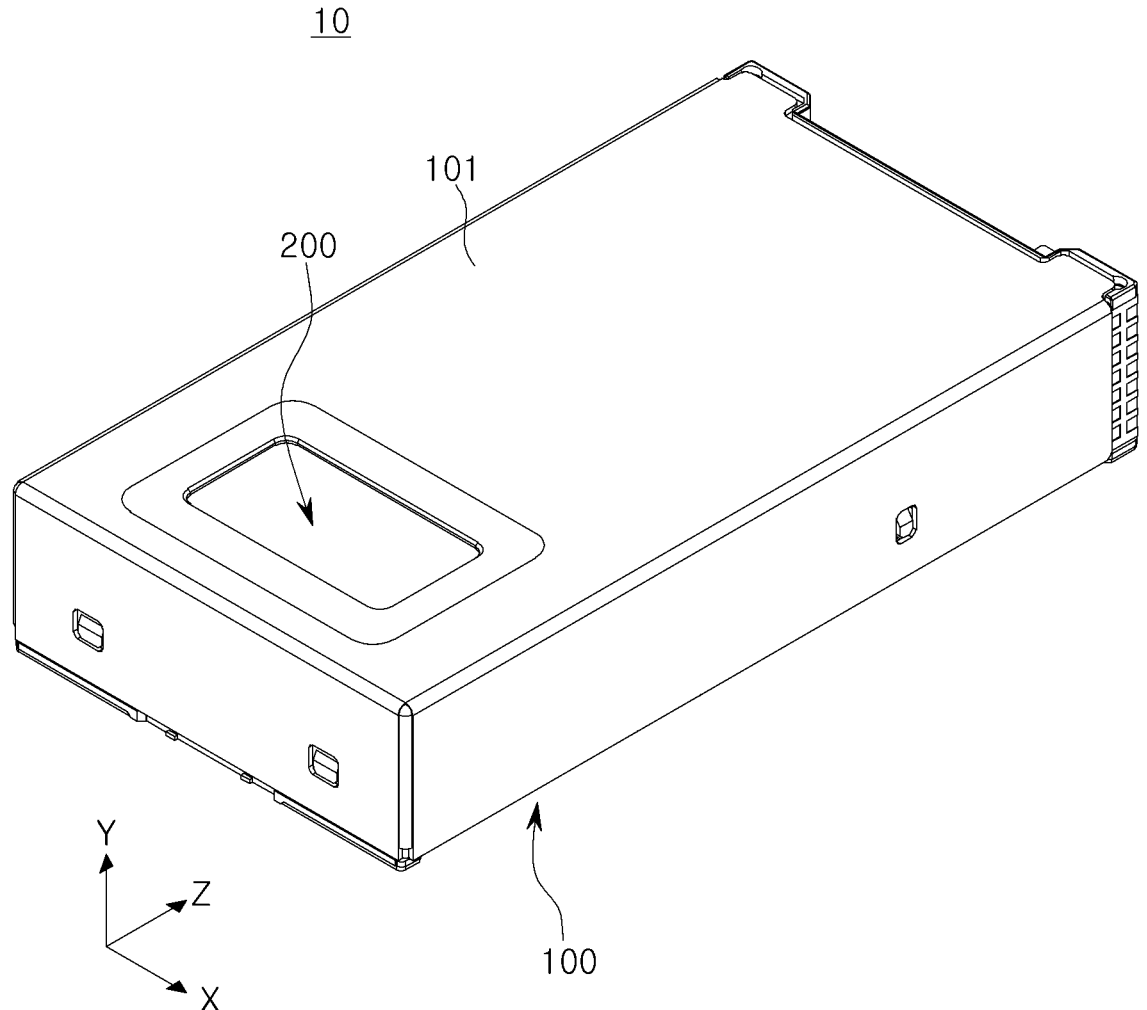
FIG. 2 is a perspective view of an example camera module, in accordance with one or more embodiments.
Figure 3:
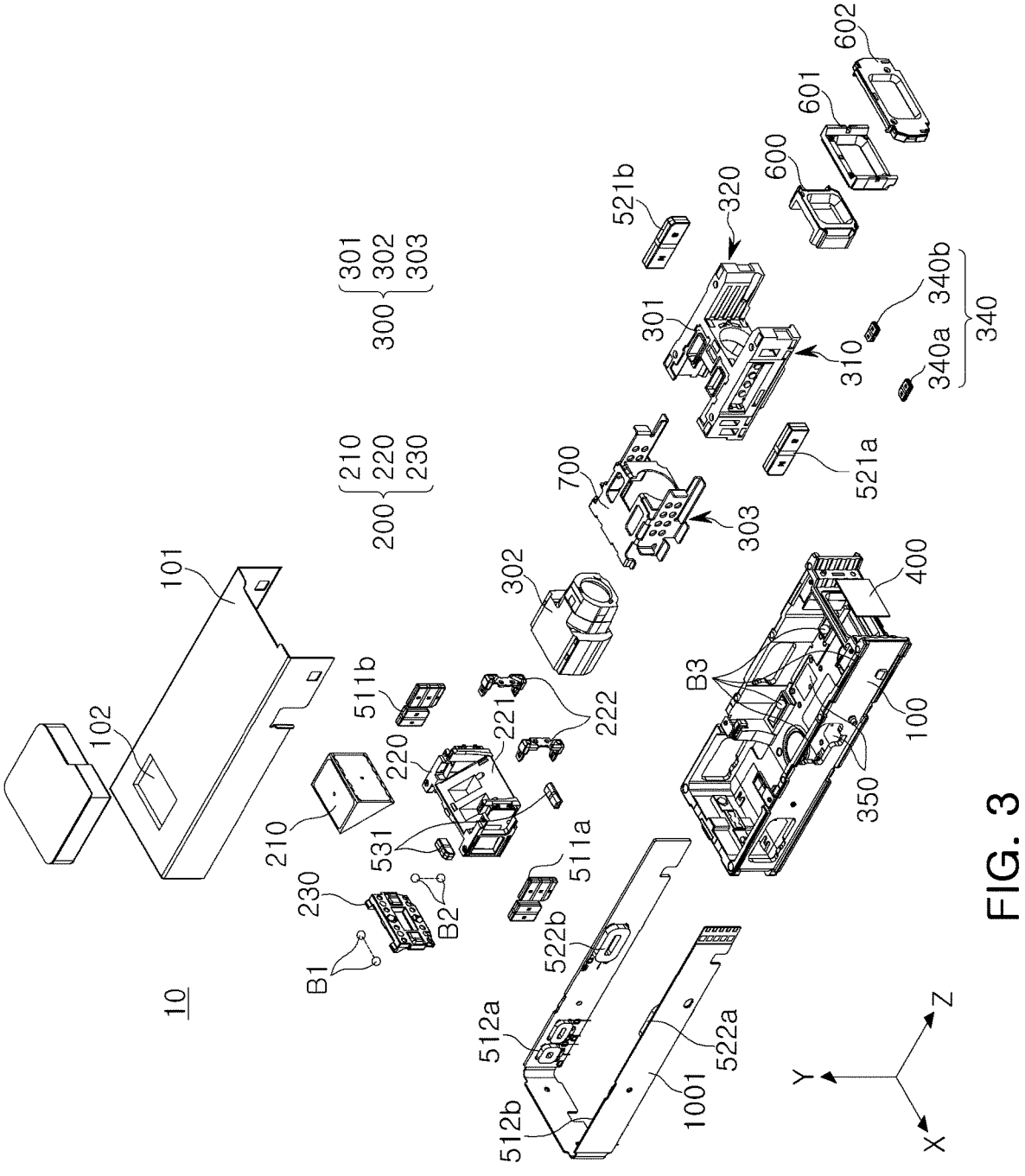
FIG. 3 is an exploded perspective view of an example camera module, in accordance with one or more embodiments.

FIG. 2 is a perspective view of the camera module 10 according to an example, and FIG. 3 is an exploded perspective view of the camera module 10 according to an example.

Since the camera module 10 described in FIGS. 2 and 3 may include all the features of the camera module 10 of FIG. 1 described above, a description overlapping with FIG. 1 will be omitted.

The camera module 10 includes a housing 100, a reflection module 200, a lens module 300, and an image sensor module 400.

The housing 100 may include an internal space in which the reflection module 200, the lens module 300, and the image sensor module 400 are accommodated. The housing 100 may have a predetermined rigidity, and may be a box-shaped member with an open top. The housing 100 may be covered by the cover 101 so that the internal space is not visible. The lid 101 may include an opening 102 that penetrates the lid 101 to allow light to enter. The cover 101 may be integrally provided to cover the entire housing 100. Alternately, the reflection module 200 and the lens module 300 may be implemented as separate members, with separate covers 101 covering each of them.

The reflection module 200 may be configured to change the propagation direction of light. Light may be incident through the opening 102 of the cover 101 that covers the top of the camera module 10. The path of the light incident through the opening 102 is changed toward the lens module 300 by the reflection module 200. For example, the path of the light incident in the thickness direction (Y-axis) of the camera module 10 may be changed to approximately coincide with the optical axis (Z-axis) direction by the reflection module 200.

The reflective module 200 may include a reflective member 210 that reflects light, and a reflective holder 220 that supports the reflective member 210. The reflective member 210 may be configured as a mirror or a prism to change the propagation path or direction of light. However, the reflective member 210 is not limited thereto, and may be provided as anything that can change the propagation path of light.

The reflective member 210 may be accommodated in the reflective holder 220, and may be provided to enable rotational or translational motion together with the reflective holder 220. The reflective holder 220 includes a mounting surface 221 on which the reflective member 210 is mounted. The mounting surface 221 of the reflective holder 220 may be configured as an inclined surface so that the path of light is changed. For example, the mounting surface 221 may be an inclined surface that is inclined by 30° to 60° with respect to the optical axis (Z-axis) of the plurality of lenses. Additionally, the inclined surface of the reflective holder 220 may face the opening 102 of the cover 101 through which light is incident.

The reflection module 200 may further include a guide member 230 that guides the movement of the reflection member 210. For example, the guide member 230 may be disposed between the reflective holder 220 and the housing 100 to guide the reflective holder 220 to move while being supported on the inner wall of the housing 100.

One or more ball members B1 and B2 may be disposed between the reflective holder 220 and the guide member 230 and between the guide member 230 and the housing 100. The one or more ball members B1 and B2 may form a rotation axis of the reflective member 210 or may constitute a movement path. For example, as illustrated in FIG. 3, a plurality of first ball members B1 may be disposed between the guide member 230 and the housing 100, and the plurality of first ball members B1 may be aligned in a predetermined direction to form a first rotation axis. Additionally, a plurality of second ball members (B2) may be disposed between the guide member 230 and the reflective holder 220, and the plurality of second ball members B2 may be aligned in a direction that is different from the direction in which the plurality of first ball members B1 are aligned to form a second rotation axis. In this example, the first axis of rotation and the second axis of rotation may mean an axis perpendicular to the optical axis (Z-axis), and the first axis of rotation and the second axis of rotation may be mutually perpendicular.

The first ball member B1 and the second ball member B2 may be spherical members, but are not limited thereto. For example, the first ball member B1 and the second ball member B2 may be provided in a cylindrical shape. Alternatively, the first ball member B1 and the second ball member B2 may refer to protrusions that are integrally formed with at least one of the reflective holder 220, the guide member 230, and the housing 100, respectively.

The housing 100 includes a first driving unit 510, (511a, 511b, 512a, and 512b), and a second driving unit 520 (521a, 521b, 522a, 522b) that drive the reflection module 200 and the lens module 300, respectively. The first driving unit 510 includes a plurality of coils 512a and 512b, and magnets 511a and 511b that drive the reflection module 200, and the second driving unit 520 includes a plurality of coils 522a and 522b and magnets 521a and 521b that drive the lens module 300. However, the configuration of the first driving unit 510 and the second driving unit 520 is not limited thereto, and may be comprised of any element that generates a driving force that enables the movement of the reflection module 200 and the lens module 300.

The first driver 510 may implement an Optical Image Stabilizer (01S) function or operation by moving the reflective holder 220 on which the reflective member 210 is mounted. For example, when image or video shake occurs due to the user's hand shake, the shake may be compensated by imparting a relative displacement corresponding to the shake to the reflective holder 220.

The second driver 520 drives the lens module 300 to implement Autofocusing (AF) and Zoom functions or operations. For example, the second driver 520 moves the lens barrel 302 coupled to the lens carrier 301 in the optical axis (Z-axis) direction to adjust the distance between the lens module 300 and the image sensor module 400. FIG. 3 illustrates one lens barrel 302. However, the examples are not limited thereto, and may include a plurality of lens barrels.

To limit the movement range of the reflection module 200 or the lens module 300, the camera module 10 according to an example may include one or more stoppers 222 disposed in the internal space of the housing 100. In a non-limited example, the stopper 222 may be formed in a hook shape, and may be fixed while being caught in the housing 100.

The lens module 300 may include a lens barrel 302 that accommodates a plurality of lenses, and a lens carrier 301 that moves in an optical axis (Z-axis) direction together with the lens barrel 302. A plurality of lenses to image a subject may be accommodated in the lens barrel 302, and a plurality of lenses are mounted on the lens barrel 302 along the optical axis (Z-axis). The light whose path or direction is changed by the reflection module 200 is incident to the lens module 300. Accordingly, the optical axis (Z-axis) of the plurality of lenses may be formed perpendicular to the thickness direction (Y-axis) of the camera module 10.

Referring to FIG. 3, in the lens module 300 of the camera module 10 according to an example, the first magnetic body 340 mounted on the lens carrier 301 and the second magnetic body 350 mounted on the housing 100 may be supported by the housing 100 by a magnetic force. As an example, the first magnetic body 340 including at least one magnet may be mounted on the lower end of the lens carrier 301, and the second magnetic body 350 including at least one yoke may be mounted on the housing 100. However, the one or more examples are not limited thereto, and both the first magnetic body 340 and the second magnetic body 350 may be magnets, and one may be a yoke, one may be a magnet.

The lens carrier 301 may further include a rear yoke 303. Referring to FIG. 3, the rear yoke 303 may be coupled to the lens carrier 301. In an example, the rear yoke 303 may be made of a magnetic metal material. Additionally, the rear yoke 303 illustrated in FIG. 3 may be integrally formed with a reinforcing member 700 to be described later.

Light blocking members 600, 601, and 602 may be disposed on the side of the lens carrier 301 in a direction toward the image sensor module 400.

Figure 4:
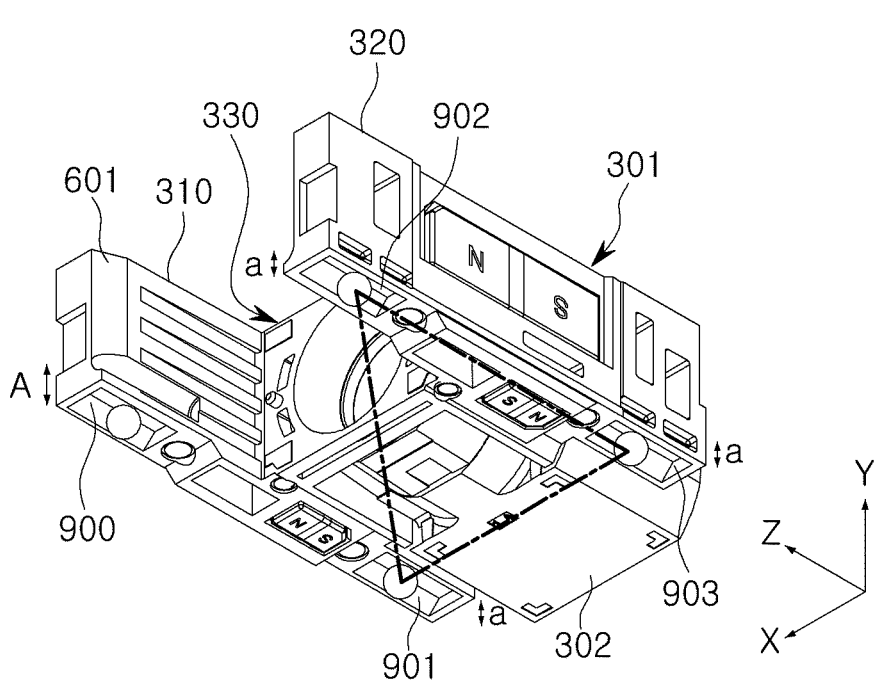
FIG. 4 is a perspective view of an example lens module, in accordance with one or more embodiments.

FIG. 4 is a perspective view of a lens module.

The lens module 300 of the camera module 10 according to an example may be formed by separating the lens carrier 301 and the lens barrel 302. However, the one or more examples are not limited thereto, and the lens carrier 301 and the lens barrel 302 may be integrally formed. FIG. 4 illustrates a lens module in which the lens carrier 301 and the lens barrel 302 are provided as separate parts and coupled to each other.

When the lens carrier 301 and the lens barrel 302 are formed separately, the length in the optical axis (Z-axis) direction of the lens carrier 301 compared to the example where the lens carrier 301 and the lens barrel 302 are integrally formed easy to extend, and for example, the lens carrier 301 according to an example includes a plurality of extensions 310 and 320 that extend in the optical axis (Z-axis) direction, and the length in the optical axis (Z-axis) direction may be longer than the length of the lens barrel 302. As such, when the optical axis (Z-axis) direction length of the lens carrier 301 is extended, the driving force of the lens carrier 301 may be improved, it is possible to provide a more stable ball support structure. A detailed description of this will be described later as in the description of the plurality of extensions 310 and 320 according to an example.

Additionally, when the lens carrier 301 and the lens barrel 302 are separately manufactured, it is advantageous in terms of parts management. For example, since the lens barrel 302 in which the plurality of lenses are accommodated is manufactured separately from the lens carrier 301, it is easy to manage the perpendicularity of the ball rolling part formed on the lens carrier 301.

Additionally, the structure in which the lens carrier 301 and the lens barrel 302 are separated has various advantages such as reduced assembly cost, and in an example to be described later, a lens module 300 having a structure in which the lens carrier 301 and the lens barrel 302 are separated will be described.

Referring to FIGS. 3 to 4, the lens carrier 301 may include a plurality of extensions 310 and 320 that extend in the optical axis (Z-axis) direction. In this example, the plurality of extensions 310 and 320 may be formed integrally with the lens carrier 301 or may be formed by attaching a separate member. Additionally, the plurality of extensions 310 and 320 may be spaced apart from each other in a direction perpendicular to the optical axis (Z-axis).

The plurality of extensions 310 and 320 illustrated in FIG. 4 may include a first protrusion 310 and a second protrusion 320 that protrude from one end of the lens carrier 301 in the optical axis (Z-axis) direction. The first protrusion 310 may protrude from one end of the lens carrier 301 in the optical axis (Z-axis) direction, and the second protrusion 320 may protrude from the other end of the lens carrier 301 in the optical axis (Z-axis) direction. At this time, the distance from the optical axis (Z-axis) to the first protrusion 310 and the second protrusion 320 may be formed to be the same.

Referring to FIGS. 3 to 4, the lens carrier 301 according to an example may be formed in an H shape. For example, the first protrusion 310 and the second protrusion 320 that extend from the lens carrier 301, may be disposed to face each other, and the support member 330 connecting the first protrusion 310 and the second protrusion 320 in a direction perpendicular to the optical axis (Z-axis) may be disposed.

End edges of the first protrusion 310 and the second protrusion 320 according to an example may be formed to have a curved surface or an inclined surface in a direction away from the optical axis (Z-axis). For example, the end edges of the first protrusion 310 and the second protrusion 320 may have a chamfer shape or a C-cut shape.

The lens carrier 301 according to an example may further include a support member 330 disposed between the first protrusion 310 and the second protrusion 320. The support member 330 may be integrally formed with the first protrusion 310 and the second protrusion 320, and a separate member may be attached and formed. The support member 330 may be in contact with one surface of the lens barrel 302 in the optical axis (Z-axis) direction, and may be in the shape of a hole in the optical axis (Z-axis) direction to pass light.

The plurality of extensions 310 and 320 according to an example extend the length of the lens carrier 301 in the optical axis (Z-axis) direction, thereby having the following advantages.

When the lens carrier 301 is supported by the ball member with magnetic force (e.g., magnetic attraction) generated between the first magnetic body 340 and the second magnetic body 350, the center of magnetic attraction generated by the first magnetic body 340 and the second magnetic body 350 should be located within the region formed by the support point of the ball member. When the center of magnetic attraction is located outside the region formed by the support point of the ball member, the lens carrier 301 is not supported by the housing 100 and is biased toward one side. When the distance between the ball members is widened, a region in which the center of magnetic force can be located is secured, thereby providing a stable structure. For example, an increase in the distance between the ball members is advantageous in securing the Tilt Margin.

In the example of the lens carrier 301 according to an example, by disposing the ball rolling part and the ball member on one end of the first protrusion 310 and on the lens carrier 301 spaced apart from the first protrusion 310 in the optical axis (Z-axis) direction, respectively, the distance in the optical axis direction between the ball members may be widened. Similarly, by disposing the ball rolling part and the ball member on one end of the second protrusion 320 and the lens carrier 301 spaced apart from the second protrusion 320 in the optical axis (Z-axis) direction, respectively, the distance in the optical axis direction between the ball members may be widened. Accordingly, the area in which the driving center of the lens carrier 301 can be located is increased, thereby allowing the lens carrier 301 to be stably supported by the housing 100.

Additionally, the plurality of extensions 310 and 320 may enable the magnets having an increased size in the optical axis (Z-axis) direction to be disposed. In this example, the driving force may be improved by arranging a magnet whose size is increased in the longitudinal direction (optical axis direction) of the camera module 10 without increasing the height of the camera module 10.

Hereinafter, an operation example of the second driving unit 520 for autofocusing and zoom functions or operations of the lens carrier 301 according to an example will be described with reference to FIGS. 3 and 4.

The lens carrier 301 is configured to be movable in the optical axis (Z-axis) direction to perform Autofocusing (AF) and Zoom operations. For example, the lens carrier 301 may be configured to be movable in a direction in which the light whose traveling direction is changed by the reflection module 200 passes through a plurality of lenses or in the opposite direction.

The second driving unit 520 generates a driving force so that the lens carrier 301 is movable in the optical axis (Z-axis) direction. For example, the second driving unit 520 includes a plurality of magnets 521a and 521b and a plurality of coils 522a and 522b disposed to face the plurality of magnets 521a and 521b.

When power is applied to the plurality of coils 522a and 522b, the lens carrier 301 on which the plurality of magnets 521a and 521b are mounted may be moved in the optical axis (Z-axis) direction by electromagnetic force between the plurality of magnets 521a and 521b and the plurality of coils 522a and 522b.

The plurality of magnets 521a and 521b are mounted on the lens carrier 301. For example, the plurality of magnets 521a and 521b may be mounted on a side surface of the lens carrier 301.

The plurality of coils 522a and 522b are mounted on the housing 100. For example, the plurality of coils 522a and 522b may be mounted on the main board 1001, and the main board 1001 may be mounted on the housing 100. In this example, for convenience of descriptions, in the drawings, both the coil for the reflection module 200 and the coil for the lens module 300 may be mounted on the main board 1001. However, the one or more examples are not limited thereto. For example, the main substrate 1001 may be provided as a separate substrate on which a coil for the reflection module 200 and a coil for the lens module 300 are mounted, respectively. On the other hand, a plurality of ball members B3 may be disposed between the lens carrier 301 and the housing 100. The plurality of ball members B3 according to an example are provided one by one in a plurality of ball guide grooves to be described later, but is not limited thereto. A plurality of ball members may be provided in any one guide groove.

The plurality of ball members B3 roll in the optical axis (Z-axis) direction based on the driving force generated from the second driving unit 520. Accordingly, the plurality of ball members B3 guide the movement of the lens carrier 301 in the optical axis (Z-axis) direction, and in addition, are accommodated in the plurality of ball guide grooves and may also maintain a gap between the lens carrier 301 and the housing 100.

Figure 5:
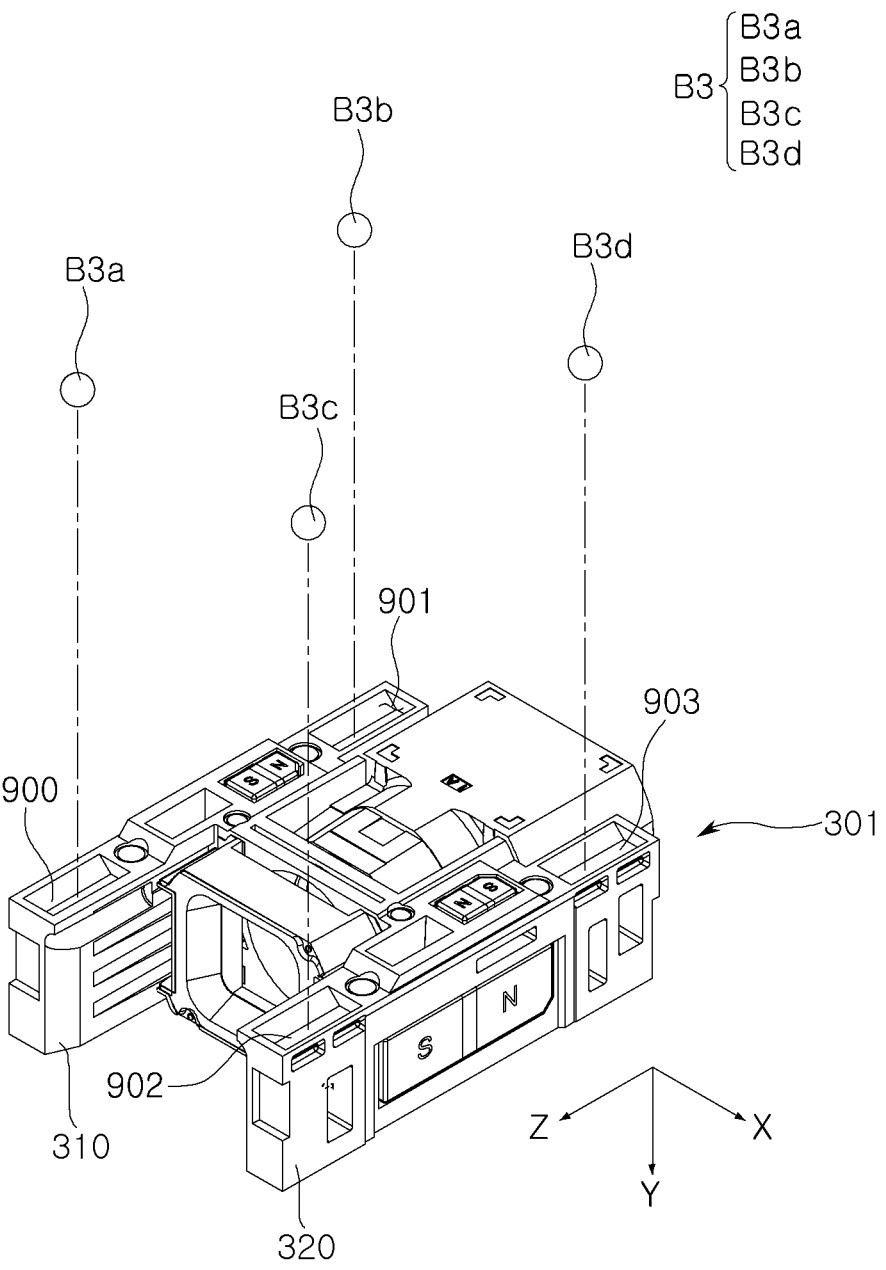
FIG. 5 is a perspective view of a lens carrier illustrating the shape of a ball rolling part formed on one surface of the lens carrier, in accordance with one or more embodiments.
Figures 6A, 6B:
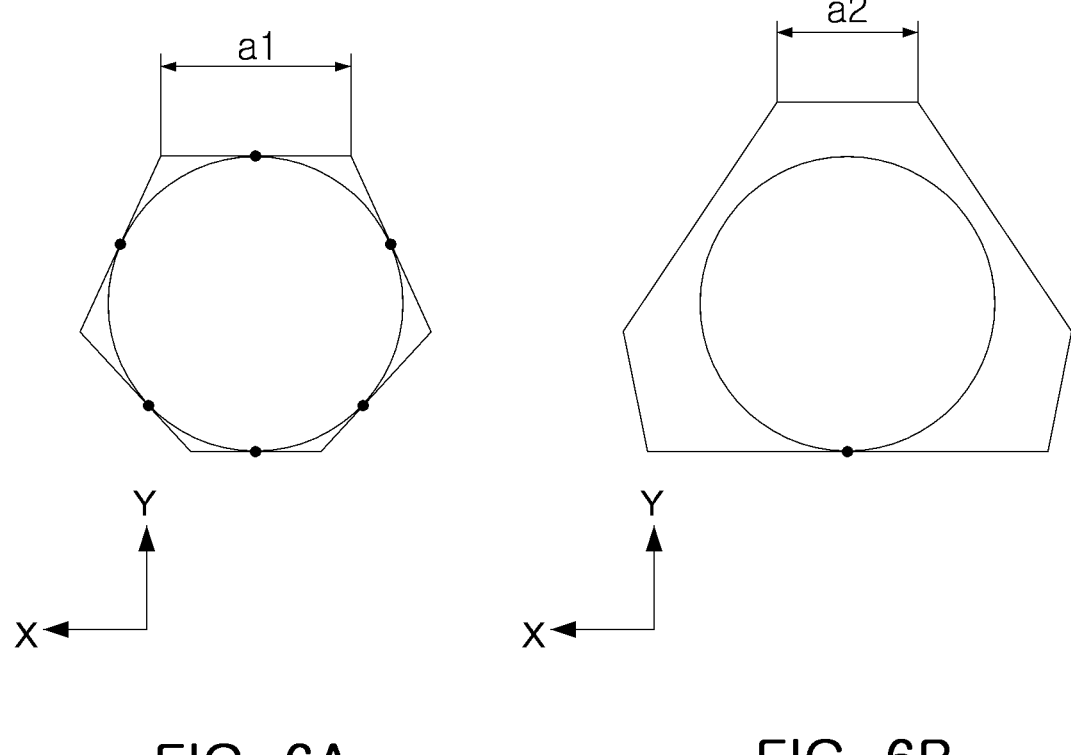
FIG. 6A and FIG. 6B are X-Y cross-sectional views of a guide groove formed on one surface of a lens carrier and a housing, in accordance with one or more embodiments.

FIG. 5 is a perspective view of a lens carrier illustrating the shape of a ball rolling part formed on one surface of the lens carrier according to an example, and FIGS. 6A and 6B are X-Y cross sectional views of a guide groove formed on one surface of the lens carrier and the housing according to an example.

Referring to FIG. 5, FIG. 6A, and FIG. 6B, the lens carrier 301 of the camera module 10 according to an example illustrates four ball members (B3a, B3b, B3c, and B3d) and four guide grooves. The guide groove is composed of two grooves respectively formed in the housing 100 and the lens carrier 301, and a ball member B3a, B3b, B3c, or B3d may be disposed between the groove of the housing 100 and the groove of the lens carrier 301. It is assumed that the ball rolling parts or portions 900, 901, 902, and 903 to be described below correspond to guide grooves provided in the lens carrier 301. For example, the first rolling portion 900 is a guide groove toward the lens carrier 301 of the first guide groove, the second rolling portion 901 is a guide groove toward the lens carrier 301 of the second guide groove, the third rolling portion 902 is a guide groove toward the lens carrier 301 of the third guide groove, and the fourth rolling portion 903 is a guide groove toward the lens carrier 301 of the fourth guide groove.

An arrangement form of the plurality of ball members and the rolling portion will be described with reference to FIG. 5. The first ball member B3a and the first rolling portion 900 may be disposed at one end of the first protrusion part 310. The second ball member B3b and the second rolling portion 901 may be disposed on the lens carrier 301 spaced apart from the first protrusion part 310 in the optical axis (Z-axis) direction. The third ball member B3c and the third rolling portion 902 may be disposed at one end of the second protrusion part 320. The fourth ball member B3d and the fourth rolling portion 903 may be disposed on the lens carrier 301 spaced apart from the second protrusion part 320 in the optical axis (Z-axis) direction.

A plurality of guide grooves including a plurality of ball rolling portions may be formed to be elongated in the optical axis (Z-axis) direction, respectively. At this time, the cross-section in the optical axis (Z-axis) direction of the plurality of ball rolling portions 900, 901, 902, and 903 may be in a V-shape or U-shape having two linear inclinations (slopes). As an example, the inner side of the plurality of ball rolling portions 900, 901, 902 and 903 may include two surfaces inclined with respect to the optical axis (Z-axis), and one surface connecting two inclined surfaces. However, the one or more examples are not limited thereto, and the cross-section of the ball rolling part may have various shapes such as a round shape and a polygonal shape.

Hereinafter, the motion of the ball member according to an example will be described with reference to FIG. 6A and FIG. 6B.

The guide grooves respectively formed in the lens carrier 301 and the housing 100 may be formed so that the longitudinal direction thereof is parallel to the optical axis (Z-axis). Accordingly, the ball member moves in the optical axis (Z-axis) direction to guide the movement of the lens carrier 301, and performs the AF function of the camera module 10.

Accordingly, the guide groove that is implemented as the 'main rolling part' limits the movement of the ball member in the first axis (X-axis) and second axis (Y-axis) directions, and only movement in the optical axis (Z-axis) direction is possible.

For example, when the ball member contacts the ball rolling part (having a length in the optical axis (Z-axis) direction) disposed on the lens carrier 301 on at least two or more surfaces, and has two or more contact points, and contacts the ball rolling part (having a length in the optical axis (Z-axis) direction) disposed in the housing 100 at two or more points; the lens carrier 301 is moved in the optical axis (Z-axis) direction by the ball member.

On the other hand, the guide groove that is provided with a degree of freedom so that the ball member may move in a direction other than the optical axis (Z-axis) may be implemented as an 'auxiliary rolling part'.

For example, when the ball member makes a one-point contact with any one of the ball rolling part disposed on the lens carrier 301 and the ball rolling part disposed on the housing 100, the ball member has a degree of freedom capable of relative movement in a direction other than the optical axis (Z-axis) direction with respect to the configuration (lens carrier 301 or housing 100) in one-point contact, and the movement of the lens carrier 301 in the optical axis (Z-axis) direction is supported.

The configuration of the 'auxiliary rolling part' considers the influence of tolerances that may occur during the manufacture of the guide groove.

For example, when both the 'main rolling part' and the 'auxiliary rolling part' have a shape that limits the movement of the ball member only in the optical axis (Z-axis) direction, it may be difficult for the ball member to smoothly roll within the rolling part due to tolerances that may occur during manufacture of the guide groove constituting the rolling part.

Accordingly, the main rolling portion having a length in the optical axis (Z-axis) direction is in contact with the ball member at four or more points (for example, in contact with the ball rolling portion of the lens carrier 301 at two or more points, and the ball rolling portion of the housing 100) and two or more points) to guide the movement of the lens carrier 301 in the optical axis (Z-axis) direction.

The 'auxiliary rolling part' having a length in the optical axis (Z-axis) direction has a ball member to support the lens carrier 301, with the ball rolling part of the lens carrier 301 and the ball rolling part of the housing 100. However, by making a one point contact with any one of the lens carrier 301 and the housing 100, the tolerance that may occur during the manufacture of the guide groove constituting the rolling part does not affect the rolling movement of the ball member.

FIG. 6A illustrates a guide groove corresponding to the main rolling portion, in accordance with one or more embodiments, and FIG. 6B illustrates a guide groove corresponding to the auxiliary rolling portion, in accordance with one or more embodiments.

FIG. 6A illustrates a cross section of a guide groove having three contact points between the ball member and the lens carrier 301 and three contact points with the housing 100. In this example, the ball member is movable only in the optical axis (Z-axis) direction. On the other hand, FIG. 6B is a cross section of the guide groove having two contact points between the ball member and the lens carrier 301, and one contact point with the housing 100. In this example, the ball member is movable in a direction other than the optical axis (Z-axis).

Although FIG. 6A illustrates that the ball member and the lens carrier 301 have three contact points, it is also possible to configure the ball member to contact the lens carrier 301 at two points.

On the other hand, as described above, the cross-section of the ball rolling portions 900, 901, 902, and 903, which are grooves on the lens carrier 301 side of the guide groove, may be in a V-shape or U-shape having two linear inclinations. The ball rolling part according to an example may include one surface parallel to the optical axis (Z-axis) and two surfaces inclined with respect to the corresponding surface. In this example, by varying the width in the optical axis (Z-axis) direction of the ball rolling portion, the lens carrier 301 and the ball member may be in contact with two or three points. As an example, the width (a1) in the optical axis (Z-axis) direction of the rolling part illustrated in FIG. 6A is formed to be larger than the optical axis (Z-axis) direction width (a2) of the rolling part illustrated in FIG. 6B, and the lens carrier 301 and the ball member come into contact at three points.

In order for the plurality of ball members B3 according to an example to maintain contact with the lens carrier 301 and the housing 100, the lens carrier 301 may be pressed toward the housing 100. Accordingly, the second magnetic body 350 may be mounted on the housing 100 to face the first magnetic body 340 mounted on the lens carrier 301. The first magnetic body 340 may be a magnet, and the second magnetic body 350 may be a yoke. However, the one or more examples are not limited thereto, and any magnetic force (e.g., magnetic attraction) may be generated between the first magnetic body 340 and the second magnetic body 350 as having magnetism.

A magnetic attraction force may act between the first magnetic body 340 and the second magnetic body 350. Accordingly, the lens carrier 301 may be moved in the optical axis (Z-axis) direction based on the driving force of the second driving unit 520 while in contact with the plurality of ball members B3.

Hereinafter, a structure in which the lens carrier 301 is supported by the housing 100 by the plurality of ball members B3 according to an example will be described.

The lens carrier 301 illustrated in FIG. 4 has a structure in which the housing 100 is supported at three points by three ball members. In the following description, the first ball rolling portion 900, the second ball rolling portion 901, the third ball rolling portion 902, and the fourth ball rolling portion 903 corresponding to the grooves on the lens carrier 301 side among the plurality of guide grooves are formed. However, the one or more examples are not limited thereto, and any structure in which the lens carrier 301 is supported by the housing 100 at three points may be sufficient. For example, provided is a structure in which the first ball member (B3a) is in contact with any one of the lens carrier 301 or the housing 100, the second ball member B3b to the fourth ball member B3d are in contact with both the lens carrier 301 and the housing 100, and thus, the lens carrier 301 is supported at three points by a ball member. As another example, based on the guide groove in which the groove of the lens carrier 301 and the groove of the housing 100 are combined, the depth of the first guide groove may be formed to be deeper than the depth of the remaining second guide groove to the fourth guide groove. A structure in which three points are supported by the second ball member B3b to the fourth ball member B3d may also be possible. Additionally, the diameter of the first ball member (B3a) disposed on the first rolling portion 900 is formed smaller than the diameter of the remaining ball members (B3b, B3c, B3d), and a structure in which three points are supported by the second ball member B3b to the fourth ball member B3d may also be possible.

A three-point support structure of the lens carrier 301 according to an example will be described with reference to FIG. 4. In the lens carrier 301, the depth a of the second rolling portion 901, the third rolling portion 902, and the fourth rolling portion 903 may be the same. On the other hand, the depth A of the first rolling portion 900 may be formed to be greater than the depth a of the second cloud portion 901, the third rolling portion 902, and the fourth rolling portion 903. In this example, when one surface of the lens carrier 301 is supported by the housing 100, the ball member B3b provided in the second rolling portion 901, the third rolling portion 902, and the fourth rolling portion 903 may be supported by three points.

On the other hand, the ball member B3a provided in the first rolling portion 900 is provided between the lens carrier 301 and the housing 100, thereby dispersing an impact caused by an external force. Additionally, if the Tilt Margin is insufficient in the structure by the three-point support described above, it may be allowed to return to the four-point support again when a tilt occurs.

When the lens carrier 301 according to an example is supported at three points on the housing 100, a tilt phenomenon that may occur due to the four points of support is prevented.

In the example of a four-point support by the ball member, it is ideal that all the ball members are closely supported between the lens carrier 301 and the housing 100, and a ball member that is not closely supported among the plurality of ball members may be generated according to a difference in height between the support points of the ball member contacting the lens carrier 301 and the housing 100. In this example, a shake occurs between the lens module 200 and the image sensor module 400 due to a tilt phenomenon of the lens carrier 301. The three-point support structure increases the resolution of the captured image by removing the tilt phenomenon that may occur due to the four-point support.

The center of the magnetic force between the first magnetic body 340 and the second magnetic body 350 is located inside the area supported by three points. For example, a virtual line connecting the centers of the second ball member B3b, the third ball member B3c, and the fourth ball member B3d may form a triangle as illustrated in FIG. 4. The magnetic attraction by the first magnetic body 340 and the second magnetic body 350 may be a sum of a magnetic attraction acting between the first magnetic body 340a and the second magnetic body 350 disposed on one side of the lens carrier 301 and the housing 100 and of the magnetic attraction acting between the first magnetic body 340b and the second magnetic body 350 disposed on the other side of the lens carrier 301 and the housing 100. At this time, the center of magnetic attraction by the first magnetic body 340 and the second magnetic body 350 may be located inside a triangle connecting the centers of the ball members B3b, B3c, and B3d.

Figure 7:
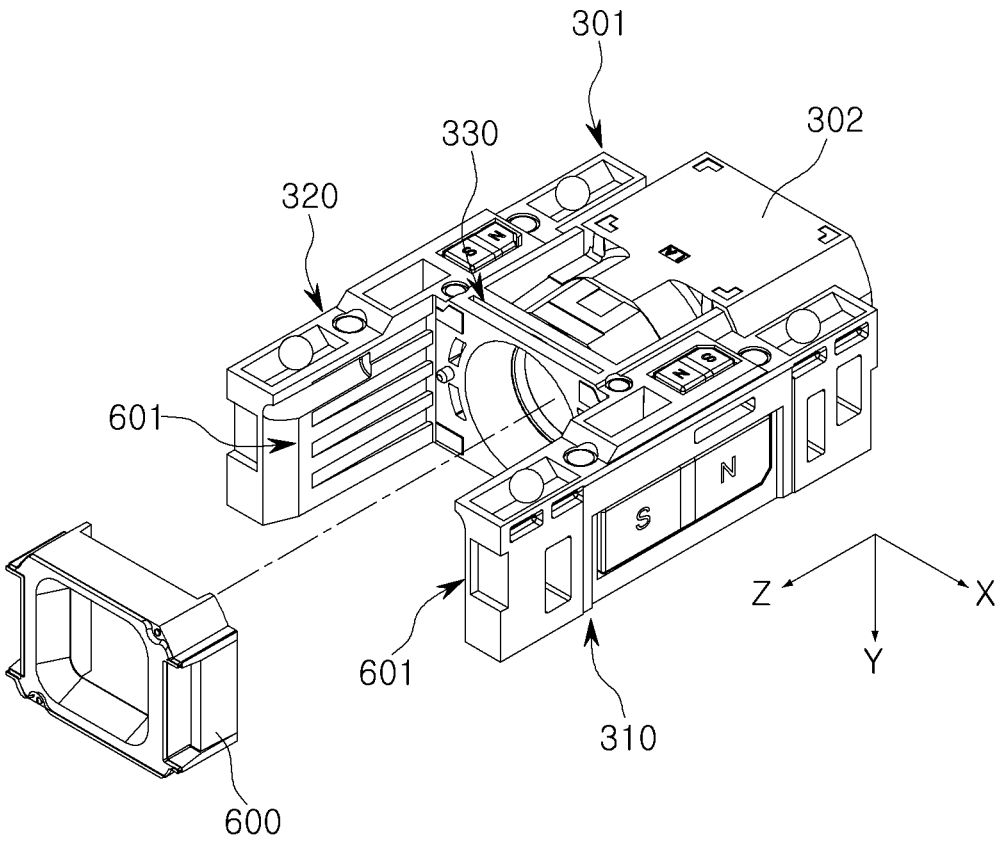
FIG. 7 is a perspective view of a lens carrier from which a light blocking member is separated, in accordance with one or more embodiments.
Figure 8:
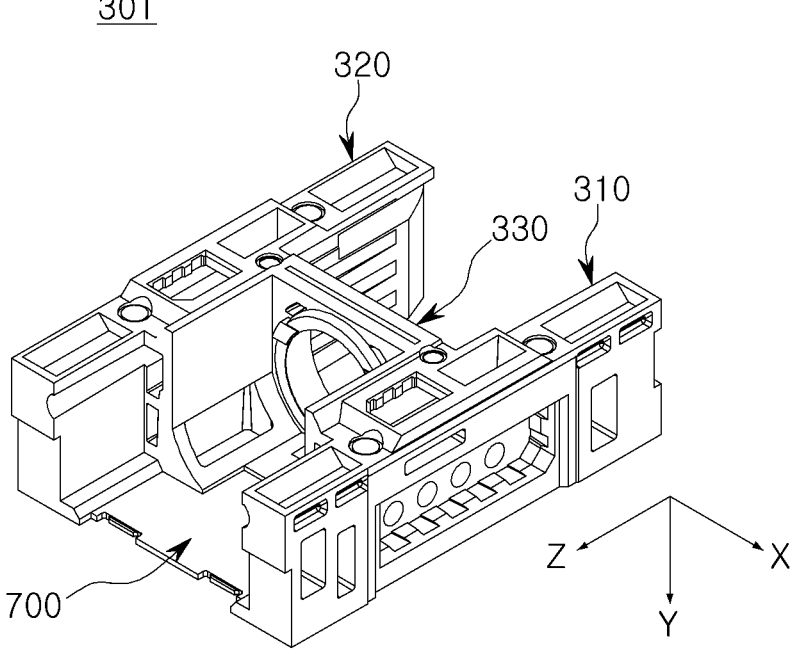
FIG. 8 is a perspective view of a lens carrier to which a reinforcing member is coupled, in accordance with one or more embodiments.

FIG. 7 is a perspective view of a lens carrier in which a light blocking member is separated, in accordance with one or more embodiments, and FIG. 8 is a perspective view of a lens carrier in which a reinforcing member is coupled, in accordance with one or more embodiments.

Referring to FIG. 7, the camera module 10, in accordance with one or more embodiments, may include a light blocking member 600 that prevents a flare phenomenon due to unintentional reflection of light. As illustrated in FIG. 3, the light blocking member 600 may further include a plurality of members 601 and 602 that may block light.

The light blocking member 600 may be disposed between the lens module 300 and the image sensor module 400. However, the one or more examples are not limited thereto, and may be disposed between the reflection module 200 and the lens module 300. In the following description, the light blocking member 600 disposed at the rear end of the lens module 300 (for example, between the lens module 300 and the image sensor module 400) will be described as a reference, which is equally applicable to the light blocking member 600 disposed between the reflection module 200 and the lens module 300.

The light blocking member 600 according to an example may include an opening in the shape of a hole in the optical axis (Z-axis) direction. The light passing through the lens module 300 may pass through the opening of the light blocking member 600 to be incident on the image sensor module 400. Among the light passing through the lens module 300, the light that may cause a flare phenomenon may be blocked by the light blocking member 600.

However, light passing through the opening of the light blocking member 600 may be reflected on one side and the other side of the lens carrier 301, and thus a flare phenomenon may occur. Therefore, the shape of the end edge provided in the first protrusion 310 and the second protrusion 320 is formed in a shape having a curved surface or an inclined surface in a direction away from the optical axis (Z-axis), and this is to allow the light to spread to a wide angle of view.

Referring to FIG. 8, the camera module 10 according to an example may further include a reinforcing member 700 disposed between one side and the other side of the lens carrier 301. The reinforcing member 700 may be integrally formed with the rear yoke 303 (FIG. 3). FIG. 8 illustrates an example in which the rear yoke 303 integrally formed with the reinforcing member 700 is coupled to the lens carrier 301. As illustrated in FIG. 3, the reinforcing member 700 may be integrally formed with the metal rear yoke 303. However, the one or more examples are not limited thereto and the reinforcing member 700 may be formed as a separate member.

Additionally, when the lens carrier 301 is provided in an H shape, an empty space may be formed between one side and the other side of the lens carrier 301. The reinforcing member 700 may be formed in an empty space between one side and the other side of the lens carrier 301 to prevent inner bending of the lens carrier 301. The reinforcing member 700 illustrated in FIGS. 3 and 8 is formed in the opposite direction to the plurality of extensions 310 and 320 with respect to the support member 330, but the one or more examples are not limited thereto. For example, the reinforcing member 700 may be formed between the first protrusion 310 and the second protrusion 320.

As set forth above, the camera module according to an example may stably support the lens module during auto-focusing.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing configured to have an internal space;
   a lens module, disposed in the internal space, and comprising at least one lens;
   a first magnetic body and a second magnetic body disposed on surfaces on which the housing and the lens module face each other, respectively, and configured to have magnetic forces which act on each other; and
   a plurality of ball members disposed in respective guide grooves between the housing and the lens module,
   wherein the lens module comprises a plurality of extensions which extend in an optical axis direction, and are spaced apart from each other in a direction, perpendicular to an optical axis,
   wherein at least one of the plurality of ball members is disposed between the plurality of extensions and the housing,
   wherein end edges of the plurality of extensions are configured to have one of a curved surface and an inclined surface in a direction away from the optical axis, and
   wherein a depth of one guide groove of the respective guide grooves is deeper than depths of other guide grooves of the respective guide grooves.

2. The camera module of claim 1, wherein the lens module comprises:
   a lens carrier configured to move in the optical axis direction; and
   a lens barrel, disposed inside the lens carrier, and configured to accommodate the at least one lens,
   wherein the plurality of extensions are disposed on the lens carrier.

3. The camera module of claim 2, wherein the camera module comprises a reinforcing member disposed between a first side and a second side of the lens carrier.

4. The camera module of claim 2, wherein the plurality of extensions comprise:
   a first protrusion that protrudes from a first side of the lens carrier in the optical axis direction; and
   a second protrusion that protrudes from a second side of the lens carrier in the optical axis direction,
   wherein the first protrusion and the second protrusion are spaced apart from each other in a direction, perpendicular to the optical axis.

5. The camera module of claim 4, wherein the first protrusion and the second protrusion are symmetrical in a direction, perpendicular to the optical axis.

6. The camera module of claim 4, wherein the lens module comprises a support member that is configured to connect the first protrusion and the second protrusion,
   wherein a first surface of the support member is in contact with the lens barrel in the optical axis direction, and a second surface of the support member has a hole shape in the optical axis direction.

7. The camera module of claim 6, wherein the camera module comprises a light blocking member disposed between the first side of the lens carrier and the second side of the lens carrier, in contact with the support member, and configured to have a hole shape through which light passes in the optical axis direction.

8. The camera module of claim 4, wherein the plurality of ball members comprise:
   a first ball member disposed between the first protrusion and the housing,
   a second ball member disposed between the first side of the lens carrier and the housing,
   a third ball member disposed between the second protrusion and the housing; and
   a fourth ball member disposed between the second side of the lens carrier and the housing.

9. The camera module of claim 8, wherein the second ball member, the third ball member, and the fourth ball member are configured to contact the lens module and the housing, and
   wherein the first ball member is in contact with one of the lens module and the housing.

10. The camera module of claim 8, wherein the first ball member has a diameter that is less than diameters of the second ball member, the third ball member, and the fourth ball member.

11. The camera module of claim 8, wherein, of the respective guide grooves:

a first guide groove that accommodates the first ball member is respectively disposed on surfaces of the first protrusion and the housing that face each other, a second guide groove that accommodates the second ball member is disposed on surfaces on which the first side of the lens carrier and the housing face each other, respectively, a third guide groove that accommodates the third ball member is respectively disposed on surfaces of the second protrusion and the housing which face each other, a fourth guide groove that accommodates the fourth ball member is respectively disposed on surfaces on which the second side of the lens carrier and the housing face each other, and a depth of the first guide groove of at least one of the first protrusion and the housing is different from a depth of the second guide groove, the third guide groove, and the fourth guide groove.

12. The camera module of claim 11, wherein the first ball member and the second ball member are spaced apart from each other in the optical axis direction, and the third ball member and the fourth ball member are spaced apart from each other in the optical axis direction.

13. The camera module of claim 8, wherein the first ball member is in two-point contact with one of the lens module and the housing, and the second ball member is in two-point contact with one of the lens module and the housing and is in one-point contact with another of the lens module and the housing, and wherein the third ball member and the fourth ball member are in contact with the lens module and the housing at two points, respectively.

14. The camera module of claim 2, wherein the lens carrier is configured to have an H-shape structure based on relative positions of the plurality of extensions and a supporting member configured to connect the plurality of extensions.

15. The camera module of claim 1, wherein any one of the plurality of ball members is configured to be in contact with one of the lens module and the housing, and wherein remaining ball members among the plurality of ball members are configured to be in contact with the lens module and the housing.

16. The camera module of claim 15, wherein a virtual line that connects centers of the remaining ball members has a triangular shape.

17. The camera module of claim 16, wherein a center of magnetic attraction acting between the first magnetic body and the second magnetic body is located inside the triangular shape connecting the centers of the remaining ball members.

* * * * *